UNITED STATES PATENT OFFICE.

JOSEPH H. EASTWICK, OF PHILADELPHIA, PENNSYLVANIA.

MANUFACTURE OF SULPHATE OF ALUMINA.

SPECIFICATION forming part of Letters Patent No. 239,089, dated March 22, 1881.

Application filed April 22, 1879.

*To all whom it may concern:*

Be it known that I, JOSEPH H. EASTWICK, of the city and county of Philadelphia, in the State of Pennsylvania, have invented certain new and useful Improvements in the Manufacture of Sulphate of Alumina, which improvements are fully set forth in the following specification.

Sulphate of alumina, or aluminous cake, has heretofore been manufactured from silicates of alumina by roasting the raw silicate and then treating this roasted silicate with sulphuric acid.

My invention consists in dispensing with this roasting process, substituting therefore a process of grinding and bolting and decomposing the silicate, as hereinafter described; and it further consists in using hydrate of alumina in combination with the sulphuric acid, to effect the decomposition of the silicate. I contemplate using the silicates of alumina, now known as "halloysites," or, from the fact that they are found in Indiana, as "Indianaites," and which are peculiarly adapted to my improved treatment. I do not, however, confine my process to these special kinds of silicates.

In carrying out my invention, the Indianaite or halloysite is first dried and then ground to a fine flour, and then thoroughly bolted. The bolted flour is then mixed, in a suitable vessel, with sulphuric acid. To this mixture of flour and acid I add hydrate of alumina, upon which the action of the acid is very violent, generating a heat of usually about 240° Fahrenheit, and thoroughly decomposing the halloysite. After the hydrate is added to the halloysite and the acid, the mixture begins to boil spontaneously, and the contents of the vessel are actively stirred until the mass begins to thicken, when it is run out through a gate provided in the bottom of the vessel into a suitable receptacle, in which it cools, giving as a resultant product a homogeneous and neutral sulphate of alumina. When cold it is ground up, and is then ready for use or for shipment in barrels or other packages.

The requisite proportions of sulphuric acid and of hydrate of alumina will vary with the quality of the silicate, and I can only give the following formula for halloysite containing about thirty-six per cent. of alumina, this being about the average quality of Indianaite or Indiana halloysite: To one hundred pounds of such halloysite, after it has been ground and bolted, as aforesaid, I add the equivalent of one hundred and forty-eight pounds of hydrated sulphuric acid, and to this quantity of halloysite and acid I add forty pounds of hydrate of alumina, which should contain about forty per cent., or sixteen pounds of alumina. These proportions may be varied more or less, so long as the alumina contained in the halloysite and in the hydrate of alumina together shall be in such proportion to the acid that the alumina and the acid will form a neutral salt. From this instance it will be readily understood that the richer the halloysite is in alumina the less hydrate will be requisite, and the poorer the halloysite the more hydrate will be essential.

Having thus described the nature of my improvements, what I claim as new, and desire to secure by Letters Patent, is—

1. The hereinbefore-described process of manufacturing sulphate of alumina by grinding and bolting the halloysite and treating the ground and bolted halloysite with sulphuric acid and hydrate of alumina, substantially as set forth.

2. The hereinbefore-described method of producing sulphate of alumina by combining hydrate of alumina with a mixture of halloysite and sulphuric acid, thereby producing spontaneous ebullition and decomposing the halloysite, substantially as set forth.

J. H. EASTWICK.

Witnesses:
A. C. FERRIS,
J. WALTER DOUGLASS.